Aug. 31, 1948.
D. MEINZINGER
2,448,384
HAND GRIP FOR FISHING LINES
Filed July 15, 1947
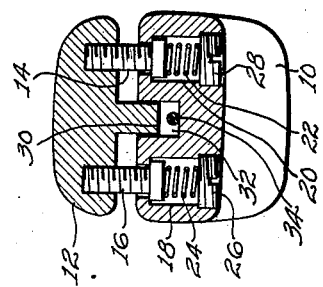
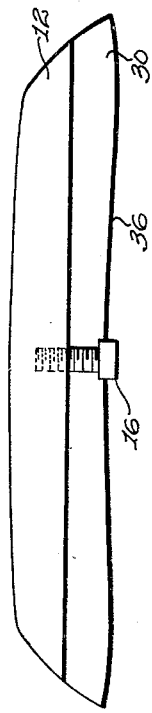
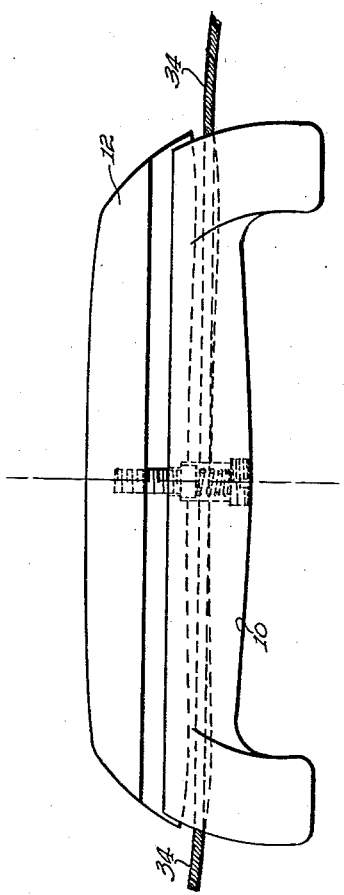
Dale Meinzinger
INVENTOR.
BY Patented Aug. 31, 1948

2,448,384

UNITED STATES PATENT OFFICE 2,448,384

HANDGRIP FOR FISHING LINES

Dale Meinzinger, Detroit, Mich.

Application July 15, 1947, Serial No. 761,089

3 Claims. (Cl. 188—65.1)

The object of this invention is to facilitate the handling of fishing line when trolling. At present if no gloves are used a blister is formed due to the line on the hand. An ordinary pair of gloves are worn out in a very short period of time.

Fig. 1 shows the gripping element in elevation.

Fig. 2 shows the gripping element assembled in place in the finger portion of the hand grip through the center of the assembled grip.

Fig. 3 is a cross-sectional elevation taken through the center of the assembled grip.

In the figures 10 is the finger portion of the hand grip. 12 is the other portion of the hand grip which is slidably fitted into the finger portion 10 of the grip.

14 and 16 are two screws projecting from the portion 12 of the hand grip 10—12 which are arranged to slide in the openings 18—20 in the finger portion 10 of the grip.

22 and 24 are compression springs which push the finger port 10 away from the element 12 of the hand grip 10—12 to permit the threading of the line.

26 and 28 are plugs screwed into the finger portion 10 to act as supports for the springs 22—24.

30 is a tongue projecting from the portion 12 of the hand grip 10—12 and 32 is a groove in the portion 10 of the hand grip 10—12. A fishing line 34 is shown threaded in place. The tongue 30 is given a wave formation 36 (Fig. 1) and is a sliding fit in the groove 32. The bottom of the groove 32 may be given a wave formation corresponding to the wave formation 36 of the tongue 30.

The best material I have found is plastic.

*Operation*

Fishing line 34 is threaded between the tongue 30 and the groove 32. When the portion 12 is squeezed against the finger portion 10 the curved surface 36 of the tongue 30 grips the line in place. The groove 32 is made with a wave formation corresponding to the wave formation 36 of the tongue 30. Hence, the line can be played out by adjusting the friction manually. The movement of the pressure is released. The springs 22—24 cause the slot 32 to open up so that the fishing line 34 can slip freely.

What I claim is:

1. A hand grip for a fishing line comprising a T-shaped in transverse cross section first element, a second element having a slot therein, a fishing line in said slot, the center portion of the T-shaped element being made slightly smaller than the slot so as to slide freely therein, spring means to separate said elements, means for limiting the separation of the two elements, the first and second elements being made to fit the human hand so as to respond to a grip to hold the fishing line in any preselected position.

2. A hand grip for a fishing line comprising hand and finger elements slidably mounted on each other so that the two elements can be closed by the grip of a hand, spring means for normally holding the two elements apart, a surface on each element between which the fishing line is guided, said two elements being adapted to respond to the grip of the hand so as to hold the fishing line in any selected position, and in which there are two cylindrical openings each having a shoulder in one element, two cap screws having heads threaded into the other element, the heads sliding in said cylindrical openings engaging with said shoulders, and in which the spring means comprise two compression springs one engaging with the head of each of said screws, two plugs one of which closes one of said cylindrical openings and acts as an abutment for one of said springs.

3. A hand grip for a fishing line comprising hand and finger elements slidably mounted on each other so that the two elements can be closed by the grip of a hand, spring means for normally holding the two elements apart, a surface on each element between which the fishing line is guided, said two elements being adapted to respond to the grip of the hand so as to hold the fishing line in any selected position, and in which there are two cylindrical two diameter openings forming shoulders in one element, two cap screws having head threaded into the other element, heads sliding in said cylindrical opening engaging with said shoulders so as to limit the separations of the two elements, and in which the spring means comprise two compression springs one in each cylindrical opening, two plugs one of which closes the open end of each of said openings and acts as the abutment for one of said springs.

DALE MEINZINGER.

REFERENCES CITED

The following references are of record in the file of this patent:

UNITED STATES PATENTS

| Number | Name | Date |
|---|---|---|
| 556,165 | Root | Mar. 10, 1896 |
| 678,246 | Hansel | July 9, 1901 |
| 1,413,690 | Slocum | Apr. 25, 1922 |
| 1,944,603 | Hecker | Jan. 23, 1934 |